J. H. MAPLESON.
TENTS.
No. 185,559. Patented Dec. 19, 1876.
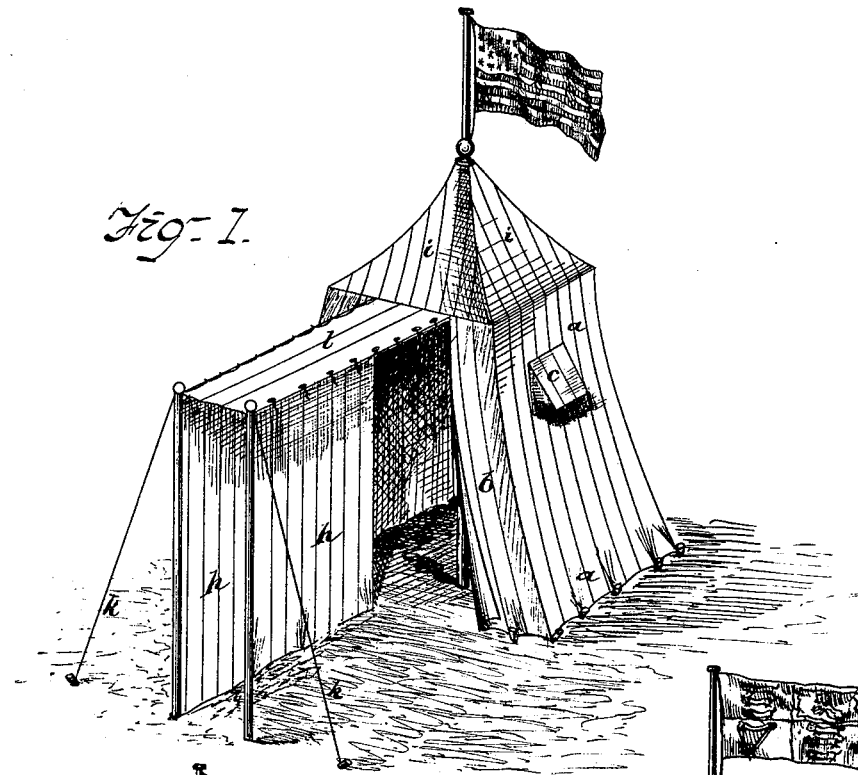
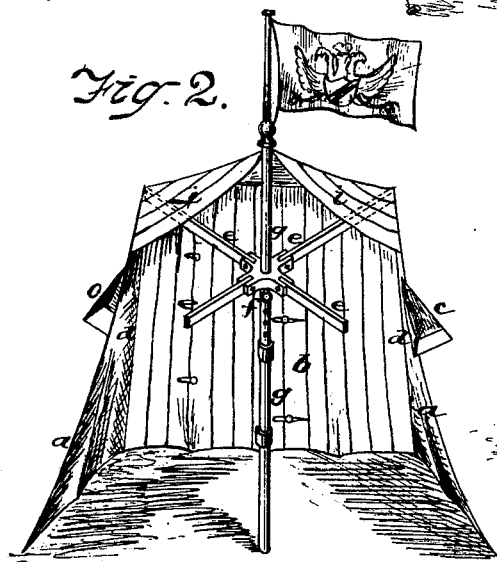
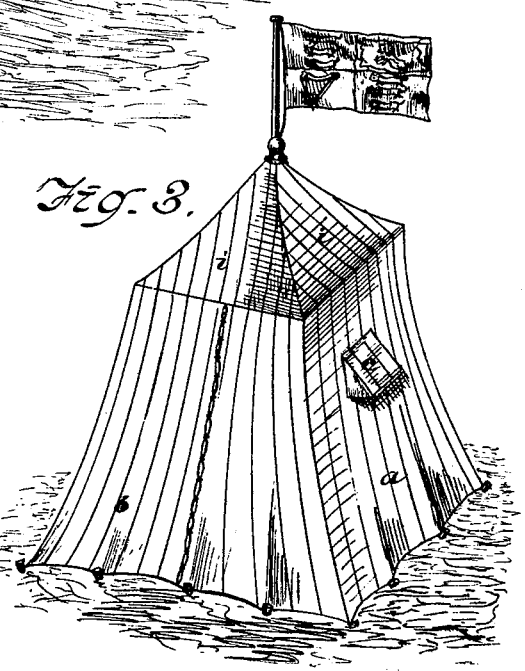

UNITED STATES PATENT OFFICE.

JAMES HENRY MAPLESON, OF LONDON, ENGLAND.

IMPROVEMENT IN TENTS.

Specification forming part of Letters Patent No. 185,559, dated December 19, 1876; application filed November 10, 1876.

*To all whom it may concern:*

Be it known that I, JAMES H. MAPLESON, of Pall Mall, London, England, have invented a new and useful Improvement in Tents, which improvement is fully set forth in the following specification, reference being had to the accompanying drawing, in which—

Figure 1 represents a perspective view of a tent containing my improvement, showing the door in position to form a screen. Fig. 2 is a vertical central section thereof. Fig. 3 is a perspective view of the same when shut.

Similar letters indicate corresponding parts.

My invention relates to the construction of tents for army, picnic, cricketing, and other uses; and it consists in combining with the body of the tent one or more doors, which are hinged or connected thereto at their top edges, so that the said door or doors can be made to occupy a horizontal position, while by thus adjusting them and fastening their outer or free ends to poles driven into the ground, they form a sun-screen or awning; further, in combining with said door or doors a sheet, which is adapted to be attached to one or the other of the side edges of said door or doors after they are brought in a horizontal position, and which serves to screen the occupant of the tent from the wind.

In the drawing, the letters *a b* designate the side walls of my tent, which, in the example shown, are four in number, and which are provided with loops, eyelets, or other devices at the lower edges, so that they can be held to the ground by stakes passed through these loops and driven into the ground. In one of the walls, *b*, I arrange a door, *l*, which is hinged or connected thereto at the top edge, so that it can be swung up to the position shown in Fig. 1, and the outer or free end attached to poles *j*, so as to act as a sun-screen or awning. The poles *j* are driven into the ground and may be held also by cords *k*. It may be here remarked that in some cases cords are attached to the corners of the tent to prevent it from vibrating to too great an extent during heavy winds.

The said door *l* is provided with suitable devices for securing them to the walls *b* of the tent when they are let down or shut. The letter *h* designates a sheet, which is secured to one of the side edges of the door *l*, as seen in Fig. 1, after the door has been raised, suitable fastening devices being to this end arranged along one of the edges of said sheet *h*. This sheet *h* acts as a wind-screen, and it can be fitted to either side of the door *l*, so as to adapt it to the direction of the wind.

For the purpose of expanding the tent I use a frame composed of a central pole, *g*, which is encircled by a runner, *f*, to which are attached ribs *e*. These ribs *e* extend at right angles to the pole *g*, or nearly so, into the corners of the tent, as indicated in Fig. 2 in dotted outline. The upper part of the pole *g* is provided with holes, through one of which a pin is passed for holding the runner *f* in position, but a set-screw or any other contrivance may be substituted for the holes and pin. The pole *g* is preferably jointed or made in sections, so that it can be conveniently folded up, and occupies little space when folded.

The roof of the tent is composed of four pieces run from the four sides of the tent to the top of the central pole *g*, whose lower end is driven into the ground to make it rigid.

The two side walls *a* are provided with ventilating-openings *c*, covered with hoods, which are distended by suitable bars, and prevented from flapping by cords *d*.

In some cases I use two doors, *l*, one in each of the walls *b*, and it will be noticed that when these two doors *l* are open the interior of the tent is very effectively ventilated. I prefer to use two doors, but, if seen fit, only one door may be used.

My tent can be pitched and struck with great facility by a single person in a few minutes, and by adjusting the runner *f* accordingly the ribs *e* can be allowed to drop, which instantly slackens the tent, and by this means I am enabled to allow for shrinkage of the canvas in wet weather, and the disagreeable duty of having to go outside the tent at all times to slacken the tent-lines is entirely overcome.

I claim—

1. The combination, with the body of a tent, of one or more doors, $l$, hinged or connected thereto at the top edge or edges, substantially as and for the purpose described.

2. The combination of a supplemental door or sheet, $h$, with the door or doors $l$, substantially as and for the purpose described.

J. H. MAPLESON.

Witnesses:
C. L. SICERNOSK,
 6 Piccadilly, Patent Agent.
R. W. MATHEWS,
 Clerk to Messrs. Ridgway Bros.,
  Waterloo Place, S. W.